UNITED STATES PATENT OFFICE.

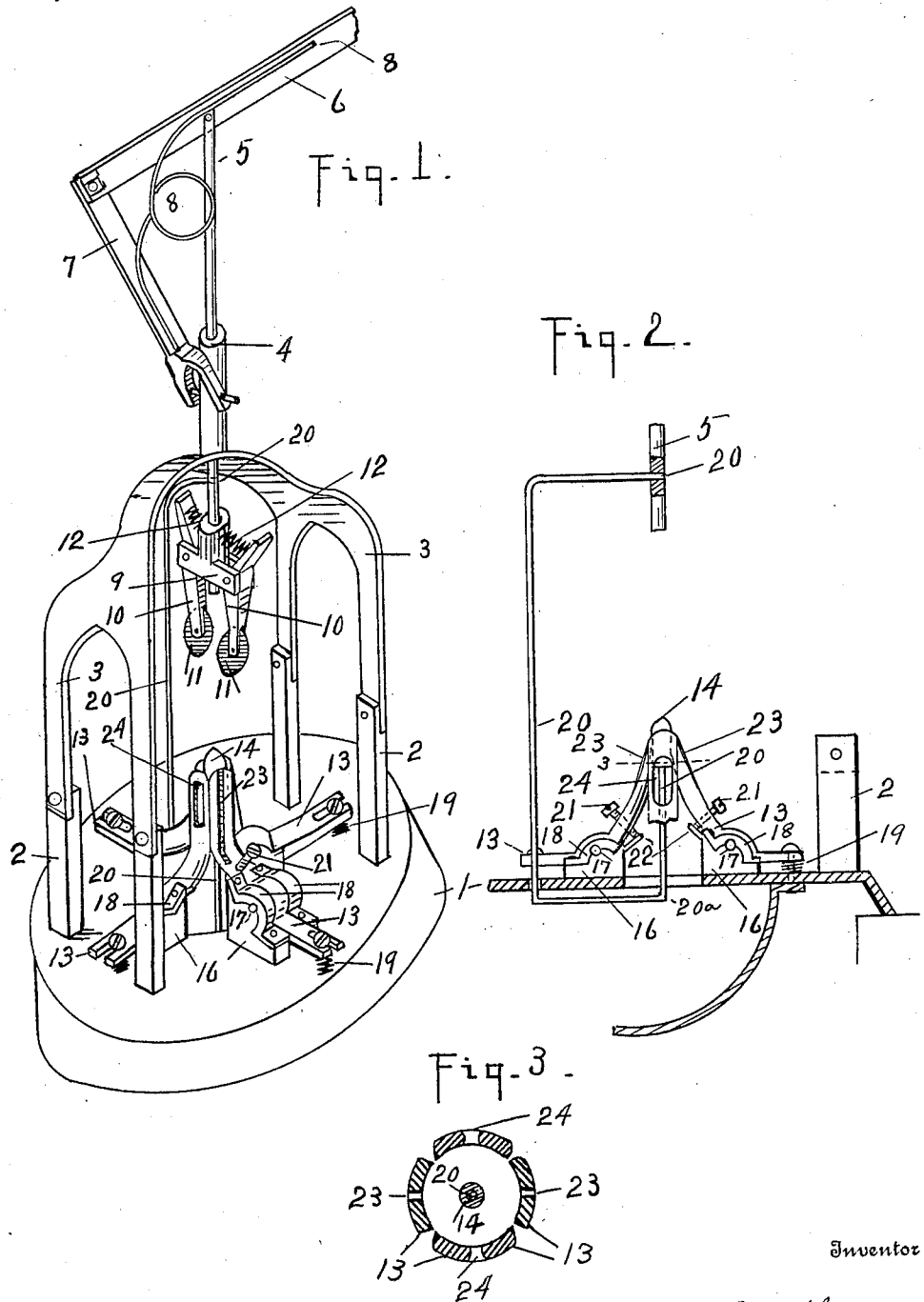

JAMES HENRY SMITH, OF LITTLE ROCK, ARKANSAS.

MACHINE FOR STONING FRUIT.

No. 913,571.  Specification of Letters Patent.  Patented Feb. 23, 1909.

Application filed July 26, 1907. Serial No. 385,626.

*To all whom it may concern:*

Be it known that I, JAMES HENRY SMITH, a resident of Little Rock, in the county of Pulaski and State of Arkansas, have invented certain new and useful Improvements in Machines for Stoning Fruit; and I do hereby declare the following to be a full, clear, and exact description of the invention, such as will enable others skilled in the art to which it pertains to make and use the same.

This invention relates to a machine for stoning fruit, and has for its object to increase simplicity of construction and efficiency and economy in operation.

The invention consists in the construction hereinafter described and particularly pointed out.

In the accompanying drawing which illustrates the invention and forms a part of this specification,—Figure 1 is a perspective view of the machine; Fig. 2 is a partial vertical section; Fig. 3 is a section on line 3 of Fig. 2.

Numeral 1 denotes a base, and 2 indicates posts fixed thereon in casting or by other means. 3 denotes a frame secured to these posts and adapted to support a plunger sleeve 4 substantially as shown. 5 denotes a rod or plunger movable in said sleeve by means of a lever 6 pivoted thereto, and connected by arm 7 to the sleeve, the connection of the arm to the sleeve being pivotal.

8 denotes a lever-returning spring.

To the lower end of the plunger 5 is removably secured a knife holder 9. Rotary knives suitably supported in arms 10 are denoted by 11. Arm-returning springs are indicated by 12. As shown the foot of the plunger extends below the holder 9 and terminates between the arms 10, preferably at about their mid length.

13 denotes blades for removing the pulp of fruit temporarily held on a centering pin or finger 14 and until the plunger is depressed by lever 6, which operation lowers the pin 14 and causes the fruit pulp to be split by the rotary knives, and forces the stone of the fruit between blades 13, supported on the base, with the effect to separate the pulp and stone and permit the latter to drop below the base. The blades 13 are supported in an automatically adjustable manner for this operation upon studs or posts 16 fixed to the base. Said posts have bearings to receive trunnions 17 fixed to the foot of the blades 13.

18 are bearing caps on the posts.

19 are springs that hold the blades to their work.

The centering pin 14 is carried by a rod 20 fixed to the plunger, and bent and extended down and rebent at 20$^a$. The parts being arranged and constructed as shown, it is obvious that the operation of the plunger will move said finger into and out of operative situation. This pin or finger is made of hard wood or other suitable material and shaped to engage or enter the stem end of peaches, plums and other fruit. The pin 14 aids the operator in placing the fruit centrally with respect to the scraping and cutting blades, and is moved simultaneously with the descent of the latter and moved below the operative edges of the scraping blades, depositing the fruit on said latter blades, being itself moved out of contact with the fruit during the cutting operation.

21 denotes adjusting screws, one for each blade 13. These bear against a fixed part of the base or frame as arms 22 extending from posts 16, and by their screw connection with the stripping blades and this bearing on the frame enable the upper ends of the blades to be held separated so as to neutralize resistance to the return of the centering pin 14 by spring 8.

There are four of the blades 13. Two opposite blades are each provided with a slit 23 in its upper end, and in using the machine the cutters 11 enter said slits as they are forced down. The other two blades have near their upper or cutting ends openings 24 of such size and shape that the edges of fruit stones being separated from the pulp will extend into such openings to a greater or less extent and sufficiently to allow the blades to move in toward each other quickly as the stone is forced down and thus remove substantially all of the pulp of the fruit. The cross section and form of the blades 13 can be varied but are curved to fit around the stones. As indicated in Fig. 2 the slitted blades 13 extend at their tips slightly within or between the intermediate blades 13. This allows the former to move nearer together and to point 14 than the latter. Both blades 13 and centering point 14 are readily removable whereby parts of different size or shape can be substituted when required by the character of the fruit to be stoned.

Having described the invention what I claim is,—

1. In a machine for stoning fruit, the combination of a base, pulp removing blades mounted upon the base, a movable centering pin between and normally exposed above said blades to engage the fruit, and a plunger to force the fruit upon the blades, said pin and plunger being in line with each other and operatively connected to move the pin.

2. In a machine for stoning fruit, the combination of a base, a plunger, a movable centering pin connected to the plunger in line therewith and supported thereby, pulp-stripping blades mounted upon the base and surrounding said pin, and cutting knives above the stripping blades, said pin being supported by the plunger at a point below said cutting blades and between the pulp-stripping blades.

3. The combination of the base, the separable frame supported on said base and provided with a plunger-guiding sleeve, a lever pivotally connected to the sleeve and plunger, the stripping blades mounted upon the base, the movable centering pin normally situated between the blades and adapted to enter the depression in the stem end of fruit, and a connection between the pin and the plunger.

4. In a machine for stoning fruit, the combination of the base, the plunger, the plunger-returning spring, the grooved posts on said base, the stripping blades provided with trunnions adapted to bear in the grooves of said posts, the detachable bearing caps whereby the blades can be replaced by others, springs pressing the blades toward each other, and means as set screws 21 for adjusting the relative situation of the blade points.

5. In a machine for stoning fruit, the combination of a base, a plunger, a centering pin fixed mediately to and movable with the plunger, four pivoted blades mounted upon said base around said pin, two opposite blades extending at their tips between the tips of the other blades, and means to move the plunger and thereby move said pin below the operative edges of said blades.

6. In a machine for stoning fruit, the combination of the base, the plunger, the cutters, and the stripping blades mounted upon the base, two oppositely situated stripping blades having below their scraping edges cutter-receiving slits, and the other two blades having openings below their operating edges to receive the edges of fruit stones as described.

7. In a machine for stoning fruit, the combination of the base, the plunger, the cutters, and the pivoted stripping blades mounted upon the base, two oppositely situated blades having below their edges cutter-receiving slits as described.

8. In a machine for stoning fruit, the combination of the base, the plunger, the cutters and the pivoted stripping blades mounted upon the base, two oppositely situated blades having below their operating edges openings to receive the edges of fruit stones as described.

In testimony whereof, I have signed this specification in the presence of two subscribing witnesses.

JAMES HENRY SMITH.

Witnesses:
L. J. BROWN,
H. L. CHRETIEN.